No. 738,083. PATENTED SEPT. 1, 1903.
J. T. TAYLOR.
APPARATUS FOR EXTERMINATION OF BOLL WEEVIL.
APPLICATION FILED MAY 4, 1903.
NO MODEL.
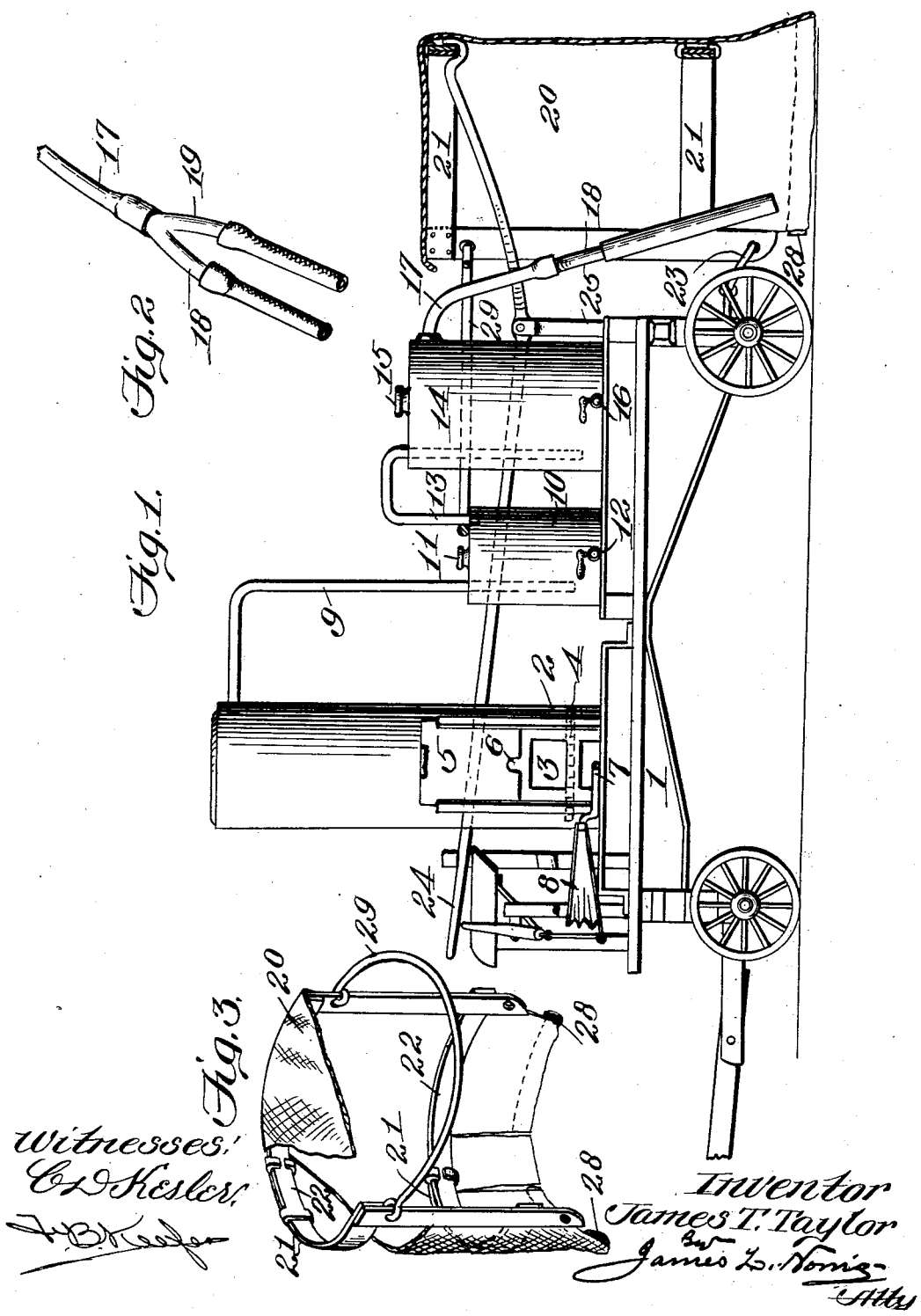

No. 738,083. Patented September 1, 1903.

UNITED STATES PATENT OFFICE.

JAMES THOMAS TAYLOR, OF WEALTHY, TEXAS.

APPARATUS FOR EXTERMINATION OF BOLL-WEEVIL.

SPECIFICATION forming part of Letters Patent No. 738,083, dated September 1, 1903.

Application filed May 4, 1903. Serial No. 155,556. (No model.)

*To all whom it may concern:*

Be it known that I, JAMES THOMAS TAYLOR, a citizen of the United States, residing at Wealthy, in the county of Leon and State of Texas, have invented new and useful Improvements in Apparatus for the Extermination of Boll-Weevil, of which the following is a specification.

This invention relates to an apparatus for the extermination of boll-weevil, although it may be adapted for the extermination of other forms of life; and it has for its object the provision of improved means for generating noxious fumes and for effectually cooling said fumes before they are permitted to permeate the atmosphere surrounding the contaminated plant, thus avoiding injury to the plant through excessive heat.

The invention comprises a vehicle carrying a furnace wherein may be generated fumes of sulfur or other suitable insecticide, means for generating a forced draft through said furnace, means for conducting the fumes generated in said furnace through a plurality of tanks containing water or other suitable cooling medium by contact with which said fumes may be cooled, means comprising a flexible forked pipe for discharging said fumes in the vicinity of the contaminated plant, means comprising an adjustable cloth hood for confining said fumes in the vicinity of the plant, and means for elevating said hood, when the vehicle is turning, to prevent injury to the plant.

The invention is illustrated in the accompanying drawings, forming a part of this specification, wherein—

Figure 1 is a sectional side elevation of my improved exterminator. Fig. 2 is a detail view of the forked delivery-pipe, and Fig. 3 is a view in perspective of the hood.

The numeral 1 indicates the body of a suitable vehicle, upon which is mounted a furnace 2. In the lower end of the furnace 2 is an opening 3, through which fuel may be introduced to the furnace and placed upon the grate 4. The opening 3 is closed by a vertically-sliding door 5. The vertically-sliding door 5 is provided at its lower end with a notch 6 for the passage of a pipe 7, which leads from the bellows 8, mounted upon the vehicle-body, and discharges the air-current generated by said bellows below the grate 4 to produce a suitable draft in the furnace. Leading from the upper end of the furnace 2 is a pipe 9, which conducts the noxious fumes generated in the furnace to a tank 10, which contains a body of water or other suitable cooling medium. The pipe 9 may terminate, if desired, below the surface of the water in the tank 10, so that the fumes conducted thereby will be forced to pass through the water in the tank, which passage of the fumes through the water causes them to be not only effectually cooled, but also moistened. The tank 10 in its upper end is provided with an inlet 11 for the introduction of water and at its lower end with an outlet 12 for the withdrawal of water. Leading from the upper end of the tank 10 is a pipe 13, which conducts the fumes contained in the tank 10 to a second tank 14, which also contains a body of water or other suitable cooling medium. The pipe 13 may, if desired, terminate below the surface of the cooling medium contained in the tank 14, as described with respect to the tank 10. By passing the noxious fumes through the cooling medium contained in the tanks 10 and 14, as described, and moistening said fumes their noxious qualities are increased, while their temperature is lowered to such a degree that they will not injure the plants with which they come in contact. The tank 14 is provided with an inlet 15 and an outlet 16 for the introduction and removal of the cooling medium. Leading from the upper end of the tank 14 is a flexible pipe 17. The pipe 17 at its lower end is forked or separated into two branch pipes 18 19, which when the apparatus is in operation straddle the row of plants and discharge the cooled fumes from the tank 14 adjacent to the contaminated plants.

In order to confine the noxious fumes in the vicinity of the contaminated plants, I have provided the hood 20, which is composed of the framework made up of sections 21 22, slidable upon each other, so that the area of the framework may be increased or diminished, as desired. The framework of the hood is covered with cloth, the lower end of which is draped loosely downward in the form of a curtain, so as permit the hood to pass over the plants being treated without causing injury thereto. The framework of the hood 20 is attached at its lower end, by means of detachable links 23, to the rear axle of the vehicle upon which the apparatus is mounted. In order to raise the hood above the level of the plant being treated when the vehicle is turned at the end of a row, I provide a lever 24, which is fulcrumed upon the upper end of an upright 25, fastened to the framework of the vehicle. The rear end of the lever 24 is attached to the hood 20, and the forward end of said lever projects adjacent to the seat occupied by the driver of the vehicle, so that it is possible for him to readily depress the forward end of the lever on turning the vehicle to elevate the hood 20. It will further be observed that the handle of the bellows 8 also projects in proximity to the position occupied by the driver, so that said bellows can conveniently be operated by him.

From the foregoing description the operation of my improved apparatus will be readily understood. A charcoal or other suitable character of fire is lighted upon the grate of the furnace 2 and a mixture of sulfur and pepper or other suitable insecticide is thrown upon said fire to generate noxious fumes in the upper end of the furnace 2. The vertically-sliding door of the furnace 2 is then closed to cut off the entrance of air to the chamber 2. It will be observed that the notch in the lower end of the vertically-sliding door of the furnace fits tightly over the pipe which conducts the air-current of the bellows into the furnace. By operating the bellows from the driver's seat a draft is created in the furnace 2, which causes the noxious fumes contained therein to pass through the tanks 10 and 14 and flexible delivery-pipes to the vicinity of the contaminated plants.

By providing two water-tanks, as described, and causing the fumes of sulfur and pepper to pass through and in contact with the cooling medium contained therein said fumes are effectually cooled and moistened before being discharged in the vicinity of the plants.

It will further be observed that the pipe leading from the bellows discharges beneath the grate of the furnace and not above said grate. By this construction an effective draft is maintained through the body of fire contained on the grate of the furnace and the insecticide mixed with said fire is caused to be entirely consumed.

If desired, a bar 28 of iron or wood may be attached to each side of the hood at its lower end. These bars 28 serve to hold the hood close to the ground and prevent the escape of noxious fumes. As the bars are only attached to the sides of the hood and not to its rear end, no impediment is offered to the passage of the hood over the plants being treated.

It will be observed, further, that I have provided a hoop 29, attached to the upper end of the hood-frame, which hoop is adapted to be fitted over the pipe 13, connecting the tanks 10 and 14, as shown in Fig. 1, for the purpose of holding the upper end of the hood in position.

Having thus described the invention, what I claim as new, and desire to secure by Letters Patent, is—

1. In an apparatus of the character specified, means for generating noxious fumes, and means for cooling and moistening said fumes.

2. In an apparatus of the character specified, means for generating noxious fumes, means for cooling and moistening said fumes, and means for feeding said cooled and moistened fumes to plants.

3. In an apparatus of the character specified, means for generating noxious fumes, means for cooling and moistening said fumes, means for feeding said cooled and moistened fumes to plants, and means for confining said fumes in the vicinity of said plants.

4. In an apparatus of the character specified, means for generating noxious fumes, and means for simultaneously cooling and moistening said fumes.

5. In an apparatus of the character specified, means for generating noxious fumes, and means for cooling and moistening said fumes by passing them through a liquid cooling medium.

6. In an apparatus of the character specified, a furnace, means for creating a draft through said furnace, a cooling-tank containing a liquid cooling medium, a pipe leading from said furnace and terminating below the surface of the cooling medium in said cooling-tank, a pipe for conducting said fumes from said cooling-tank to the plants, and means for confining said fumes in the vicinity of said plants.

In testimony whereof I have hereunto set my hand in presence of two subscribing witnesses.

JAMES THOMAS TAYLOR.

Witnesses:
 BOON ANDERSON,
 J. T. PETERS.